United States Patent
Ren et al.

(10) Patent No.: US 12,073,317 B2
(45) Date of Patent: Aug. 27, 2024

(54) METHOD AND SYSTEM FOR PROCESSING A NEURAL NETWORK

(71) Applicant: ALIBABA GROUP HOLDING LIMITED, Grand Cayman (KY)

(72) Inventors: Ao Ren, San Mateo, CA (US); Tao Zhang, San Mateo, CA (US); Yuhao Wang, San Mateo, CA (US); Yuan Xie, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 1197 days.

(21) Appl. No.: 16/736,412

(22) Filed: Jan. 7, 2020

(65) Prior Publication Data

US 2021/0209462 A1 Jul. 8, 2021

(51) Int. Cl.
*G06N 3/08* (2023.01)
*G06F 17/16* (2006.01)
*G06N 3/02* (2006.01)
*G06V 10/82* (2022.01)

(52) U.S. Cl.
CPC .............. *G06N 3/08* (2013.01); *G06F 17/16* (2013.01); *G06N 3/02* (2013.01); *G06V 10/82* (2022.01); *G06T 2207/20* (2013.01)

(58) Field of Classification Search
CPC . G06N 3/08; G06N 3/02; G06V 10/82; G06F 17/16; G06T 2207/20
See application file for complete search history.

(56) References Cited

U.S. PATENT DOCUMENTS

2012/0029925 A1* 2/2012 Duni .................. G10L 19/038
704/500
2020/0342632 A1* 10/2020 Frumkin ................ G06T 9/002

FOREIGN PATENT DOCUMENTS

| CN | 107689224 A | 2/2018 |
| CN | 108764471 A | 11/2018 |
| CN | 108932548 A | 12/2018 |
| CN | 109711532 A | 5/2019 |
| JP | 2008234657 A | 10/2008 |
| JP | 2019079291 A | 5/2019 |

OTHER PUBLICATIONS

C. Deng, S. Liao, Y. Xie, K. K. Parhi, X. Qian and B. Yuan, "PermDNN: Efficient Compressed DNN Architecture with Permuted Diagonal Matrices," 2018 51st Annual IEEE/ACM International Symposium on Microarchitecture (MICRO), 2018, pp. 189-202, doi: 10.1109/MICRO.2018.00024. (Year: 2018).*

(Continued)

*Primary Examiner* — Marc S Somers
*Assistant Examiner* — Paul J Breene
(74) *Attorney, Agent, or Firm* — Finnegan, Henderson Farabow, Garrett & Dunner, LLP (57) ABSTRACT

Embodiments of the disclosure provide methods and systems for processing a neural network associated with an input matrix having a first number of elements. The method can include: dividing the input matrix into a plurality of vectors, each vector having a second number of elements; grouping the plurality of vectors into a first group of vectors and a second group of vectors; and pruning the first group of vectors and the second group of vectors.

18 Claims, 7 Drawing Sheets

(56) References Cited

OTHER PUBLICATIONS

S. Han et al., "EIE: Efficient Inference Engine on Compressed Deep Neural Network," 2016 ACM/IEEE 43rd Annual International Symposium on Computer Architecture (ISCA), 2016, pp. 243-254, doi: 10.1109/ISCA.2016.30. (Year: 2016).*

P. Ahrens, H. Xu and N. Schiefer, "A Fill Estimation Algorithm for Sparse Matrices and Tensors in Blocked Formats," 2018 IEEE International Parallel and Distributed Processing Symposium (IPDPS), 2018, pp. 546-556, doi: 10.1109/IPDPS.2018.00064. (Year: 2018).*

"A Fill Estimation Algorithm for Sparse Matrices and Tensors in Blocked Formats," 2018 IEEE International Parallel and Distributed Processing Symposium (IPDPS), 2018 (Ahrens et al; Ahrens). (Year: 2018).*

"Cache Blocking Techniques," Intel, Sharp. (Year: 2019).*

"EIE: Efficient Inference Engine on Compressed Deep Neural Network," 2016 ACM/IEEE 43rd Annual International Symposium on Computer Architecture (Han et al; Han) (Year: 2017).*

"A Fill Estimation Algorithm for Sparse Matrices and Tensors in Blocked Formats," 2018 IEEE International Parallel and Distributed Processing Symposium (IPDPS), (Ahrens et al; Ahrens) (Year: 2018).*

First Office Action issued in corresponding Chinese Application No. 202110020349.1 on Mar. 26, 2024 (6 pages).

Peng et al., "Pruning algorithm based on GoogleNet model," Control and Decision, vol. 34, No. 6, 2019, 6 pages. (translation of abstract only).

Lu et al., "Dynamic Network Structured Pruning via Feature Coefficients of Layer Fusion," Pattern Recognition and Artificial Intelligence, vol. 32, No. 11, 9 pages. (translation of abstract only).

Lei et al., "Survey of Deep Neural Network Model Compression," Journal of Sofware, 29(2): 251-266, 2018. (translation of abstract only).

* cited by examiner

METHOD AND SYSTEM FOR PROCESSING A NEURAL NETWORK

BACKGROUND

With the development of machine learning programs, the dimensions of machine learning models have been increased significantly to improve model accuracy. A deep machine learning model, however, consumes substantial storage, memory bandwidth, energy consumption, and computational resources during model inference. These problems make it difficult to deploy deep machine learning models on mobile and embedded devices.

SUMMARY

Embodiments of the disclosure provide a computer-implement method for processing a neural network associated with an input matrix having a first number of elements. The method can include: dividing the input matrix into a plurality of vectors, each vector having a second number of elements; grouping the plurality of vectors into a first group of vectors and a second group of vectors; and pruning the first group of vectors and the second group of vectors.

Embodiments of the disclosure also provide a computing device for processing a neural network associated with an input matrix having a first number of elements. The device can include: a memory storing a set of instructions; and at least one processors coupled with the memory and configured to execute the set of instructions to cause the device to: divide the input matrix into a plurality of vectors, each vector having a second number of elements; group the plurality of vectors into a first group of vectors and a second group of vectors; and prune the first group of vectors and the second group of vectors.

Embodiments of the disclosure further provide a non-transitory computer readable medium that stores a set of instructions that is executable by one or more processors of an apparatus to cause the apparatus to execute a method for processing a neural network associated with an input matrix having a first number of elements. The method can include: dividing the input matrix into a plurality of vectors, each vector having a second number of elements; grouping the plurality of vectors into a first group of vectors and a second group of vectors; and pruning the first group of vectors and the second group of vectors.

Additional features and advantages of the disclosed embodiments will be set forth in part in the following description, and in part will be apparent from the description, or may be learned by practice of the embodiments. The features and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

Embodiments and various aspects of the disclosure are illustrated in the following detailed description and the accompanying figures. Various features shown in the figures are not drawn to scale.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1A:
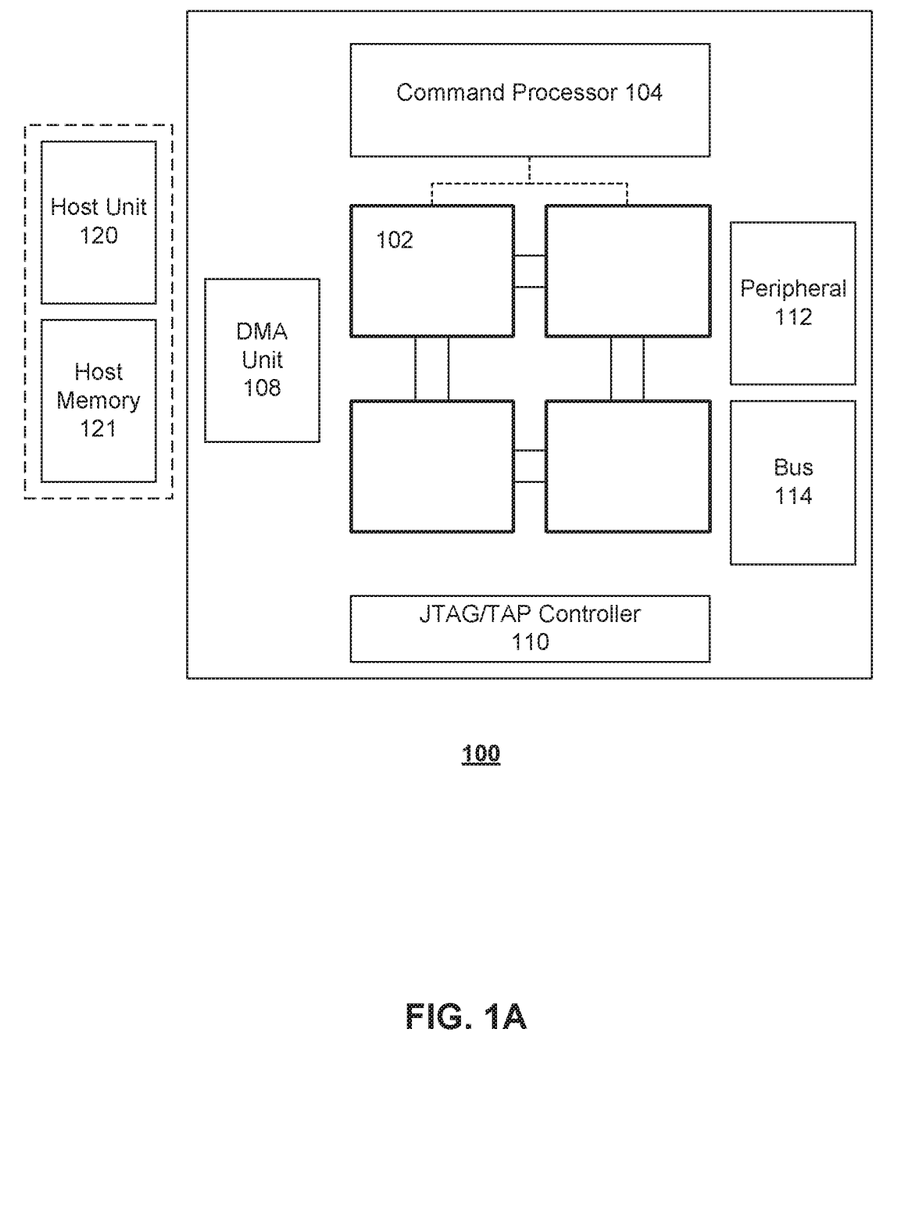
FIG. 1A illustrates an exemplary neural network accelerator architecture, according to embodiments of the disclosure.

FIG. 1A illustrates an exemplary neural network accelerator architecture, according to embodiments of the disclosure. In the context of this disclosure, a neural network accelerator may also be referred to as a machine learning accelerator or deep learning accelerator. In some embodiments, accelerator architecture 100 may be referred to as a neural network processing unit (NPU) architecture 100. As shown in FIG. 1A, accelerator architecture 100 can include a plurality of cores 102, a command processor 104, a direct memory access (DMA) unit 108, a Joint Test Action Group (JTAG)/Test Access End (TAP) controller 110, a peripheral interface 112, a bus 114, and the like.

It is appreciated that, cores 102 can perform algorithmic operations based on communicated data. Cores 102 can include one or more processing elements that may include single instruction, multiple data (SIMD) architecture including one or more processing units configured to perform one or more operations (e.g., multiplication, addition, multiply-accumulate, etc.) based on commands received from command processor 104. To perform the operation on the communicated data packets, cores 102 can include one or more processing elements for processing information in the data packets. Each processing element may comprise any number of processing units. According to some embodiments of the disclosure, accelerator architecture 100 may include a plurality of cores 102, e.g., four cores. In some embodiments, the plurality of cores 102 can be communicatively coupled with each other. For example, the plurality of cores 102 can be connected with a single directional ring bus, which supports efficient pipelining for large neural network models. The architecture of cores 102 will be explained in detail with respect to FIG. 1B.

Command processor 104 can interact with a host unit 120 and pass pertinent commands and data to corresponding core 102. In some embodiments, command processor 104 can interact with host unit under the supervision of kernel mode driver (KMD). In some embodiments, command processor 104 can modify the pertinent commands to each core 102, so that cores 102 can work in parallel as much as possible. The modified commands can be stored in an instruction buffer. In some embodiments, command processor 104 can be configured to coordinate one or more cores 102 for parallel execution.

DMA unit 108 can assist with transferring data between host memory 121 and accelerator architecture 100. For example, DMA unit 108 can assist with loading data or instructions from host memory 121 into local memory of cores 102. DMA unit 108 can also assist with transferring data between multiple accelerators. DMA unit 108 can allow off-chip devices to access both on-chip and off-chip memory without causing a host CPU interrupt. In addition, DMA unit 108 can assist with transferring data between components of accelerator architecture 100. For example, DMA unit 108 can assist with transferring data between multiple cores 102 or within each core. Thus, DMA unit 108 can also generate memory addresses and initiate memory read or write cycles. DMA unit 108 also can contain several hardware registers that can be written and read by the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, or the number of bytes to transfer in one burst. It is appreciated that accelerator architecture 100 can include a second DMA unit, which can be used to transfer data between other accelerator architectures to allow multiple accelerator architectures to communicate directly without involving the host CPU.

JTAG/TAP controller 110 can specify a dedicated debug port implementing a serial communications interface (e.g., a JTAG interface) for low-overhead access to the accelerator without requiring direct external access to the system address and data buses. JTAG/TAP controller 110 can also have on-chip test access interface (e.g., a TAP interface) that implements a protocol to access a set of test registers that present chip logic levels and device capabilities of various parts.

Peripheral interface 112 (such as a PCIe interface), if present, serves as an (and typically the) inter-chip bus, providing communication between the accelerator and other devices.

Bus 114 (such as a I²C bus) includes both intra-chip bus and inter-chip buses. The intra-chip bus connects all internal components to one another as called for by the system architecture. While not all components are connected to every other component, all components do have some connection to other components they need to communicate with. The inter-chip bus connects the accelerator with other devices, such as the off-chip memory or peripherals. For example, bus 114 can provide high speed communication across cores and can also connect cores 102 with other units, such as the off-chip memory or peripherals. Typically, if there is a peripheral interface 112 (e.g., the inter-chip bus), bus 114 is solely concerned with intra-chip buses, though in some implementations it could still be concerned with specialized inter-bus communications.

Accelerator architecture 100 can also communicate with a host unit 120. Host unit 120 can be one or more processing unit (e.g., an X86 central processing unit). As shown in FIG. 1A, host unit 120 may be associated with host memory 121.

In some embodiments, host memory 121 may be an integral memory or an external memory associated with host unit 120. In some embodiments, host memory 121 may comprise a host disk, which is an external memory configured to provide additional memory for host unit 120. Host memory 121 can be a double data rate synchronous dynamic random-access memory (e.g., DDR SDRAM) or the like. Host memory 121 can be configured to store a large amount of data with slower access speed, compared to the on-chip memory integrated within accelerator chip, acting as a higher-level cache. The data stored in host memory 121 may be transferred to accelerator architecture 100 to be used for executing neural network models.

In some embodiments, a host system having host unit 120 and host memory 121 can comprise a compiler (not shown). The compiler is a program or computer software that transforms computer codes written in one programming language into instructions for accelerator architecture 100 to create an executable program. In machine learning applications, a compiler can perform a variety of operations, for example, pre-processing, lexical analysis, parsing, semantic analysis, conversion of input programs to an intermediate representation, initialization of a neural network, code optimization, and code generation, or combinations thereof. For example, the compiler can compile a neural network to generate static parameters, e.g., connections among neurons and weights of the neurons.

In some embodiments, host system including the compiler may push one or more commands to accelerator architecture 100. As discussed above, these commands can be further processed by command processor 104 of accelerator architecture 100, temporarily stored in an instruction buffer of accelerator architecture 100, and distributed to corresponding one or more cores (e.g., cores 102 in FIG. 1A) or processing elements. Some of the commands may instruct a DMA unit (e.g., DMA unit 108 of FIG. 1A) to load instructions and data from host memory (e.g., host memory 121 of FIG. 1A) into accelerator architecture 100. The loaded instructions may then be distributed to each core (e.g., core 102 of FIG. 1A) assigned with the corresponding task, and the one or more cores may process these instructions.

Figure 1B:
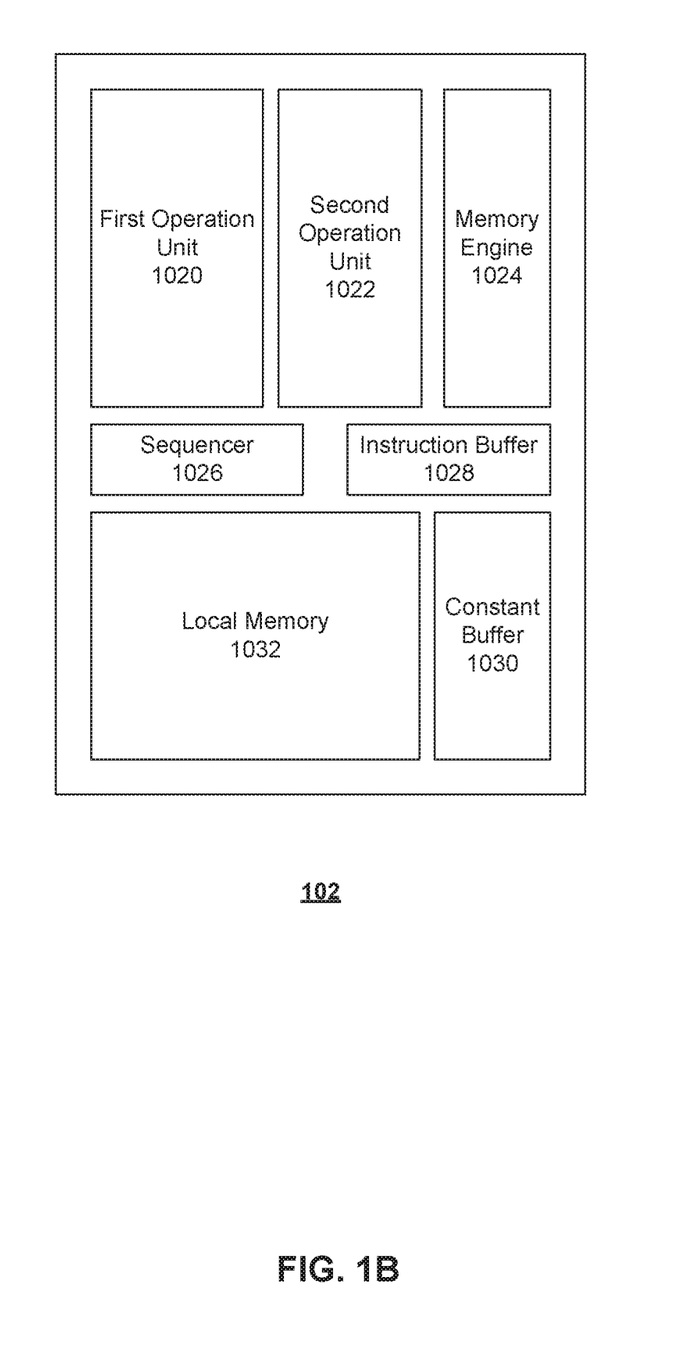
FIG. 1B illustrates an exemplary core architecture, according to some embodiments of the disclosure.

It is appreciated that the first few instructions received by the cores 102 may instruct the cores 102 to load/store data from host memory 121 into one or more local memories of the cores (e.g., local memory 1032 of FIG. 1B). Each core 102 may then initiate the instruction pipeline, which involves fetching the instruction (e.g., via a sequencer) from the instruction buffer, decoding the instruction (e.g., via a DMA unit 108 of FIG. 1A), generating local memory addresses (e.g., corresponding to an operand), reading the source data, executing or loading/storing operations, and then writing back results.

According to some embodiments, accelerator architecture 100 can further include a global memory (not shown) having memory blocks (e.g., 4 blocks of 8 GB second generation of high bandwidth memory (HBM2)) to serve as main memory. In some embodiments, the global memory can store instructions and data from host memory 121 via DMA unit 108. The instructions can then be distributed to an instruction buffer of each core assigned with the corresponding task, and the core can process these instructions accordingly.

In some embodiments, accelerator architecture 100 can further include memory controller (not shown) configured to manage reading and writing of data to and from a specific memory block (e.g., HBM2) within global memory. For example, memory controller can manage read/write data coming from core of another accelerator (e.g., from DMA unit 108 or a DMA unit corresponding to the another accelerator) or from core 102 (e.g., from a local memory in core 102). It is appreciated that more than one memory controller can be provided in accelerator architecture 100. For example, there can be one memory controller for each memory block (e.g., HBM2) within global memory.

Memory controller can generate memory addresses and initiate memory read or write cycles. Memory controller can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, or other typical features of memory controllers.

While accelerator architecture 100 of FIG. 1A can be used for convolutional neural networks (CNNs) in some embodiments of the disclosure, it is appreciated that accelerator architecture 100 of FIG. 1A can be utilized in various neural networks, such as deep neural networks (DNNs), recurrent neural networks (RNNs), or the like. In addition, some embodiments can be configured for various processing architectures, such as neural network processing units (NPUs), graphics processing units (GPUs), field programmable gate arrays (FPGAs), tensor processing units (TPUs), application-specific integrated circuits (ASICs), any other types of heterogeneous accelerator processing units (HAPUs), or the like FIG. 1B illustrates an exemplary core architecture, according to some embodiments of the disclosure. As shown in FIG. 1B, core 102 can include one or more operation units such as first and second operation units 1020 and 1022, a memory engine 1024, a sequencer 1026, an instruction buffer 1028, a constant buffer 1030, a local memory 1032, or the like.

One or more operation units can include first operation unit 1020 and second operation unit 1022. First operation unit 1020 can be configured to perform operations on received data (e.g., matrices). In some embodiments, first operation unit 1020 can include one or more processing units configured to perform one or more operations (e.g., multiplication, addition, multiply-accumulate, element-wise operation, etc.). In some embodiments, first operation unit 1020 is configured to accelerate execution of convolution operations or matrix multiplication operations. Second operation unit 1022 can be configured to perform a pooling operation, an interpolation operation, a region-of-interest (ROI) operation, and the like. In some embodiments, second operation unit 1022 can include an interpolation unit, a pooling data path, and the like.

Memory engine 1024 can be configured to perform a data copy within a corresponding core 102 or between two cores. DMA unit 108 can assist with copying data within a corresponding core or between two cores. For example, DMA unit 108 can support memory engine 1024 to perform data copy from a local memory (e.g., local memory 1032 of FIG. 1B) into a corresponding operation unit. Memory engine 1024 can also be configured to perform matrix transposition to make the matrix suitable to be used in the operation unit.

Sequencer 1026 can be coupled with instruction buffer 1028 and configured to retrieve commands and distribute the commands to components of core 102. For example, sequencer 1026 can distribute convolution commands or multiplication commands to first operation unit 1020, distribute pooling commands to second operation unit 1022, or distribute data copy commands to memory engine 1024. Sequencer 1026 can also be configured to monitor execution of a neural network task and parallelize sub-tasks of the neural network task to improve efficiency of the execution. In some embodiments, first operation unit 1020, second operation unit 1022, and memory engine 1024 can run in parallel under control of sequencer 1026 according to instructions stored in instruction buffer 1028.

Instruction buffer 1028 can be configured to store instructions belonging to the corresponding core 102. In some embodiments, instruction buffer 1028 is coupled with sequencer 1026 and provides instructions to the sequencer 1026. In some embodiments, instructions stored in instruction buffer 1028 can be transferred or modified by command processor 104.

Constant buffer 1030 can be configured to store constant values. In some embodiments, constant values stored in constant buffer 1030 can be used by operation units such as first operation unit 1020 or second operation unit 1022 for batch normalization, quantization, de-quantization, or the like.

Local memory 1032 can provide storage space with fast read/write speed. To reduce possible interaction with a global memory, storage space of local memory 1032 can be implemented with large capacity. With the massive storage space, most of data access can be performed within core 102 with reduced latency caused by data access. In some embodiments, to minimize data loading latency and energy consumption, SRAM (static random access memory) integrated on chip can be used as local memory 1032. In some embodiments, local memory 1032 can have a capacity of 192 MB or above. According to some embodiments of the disclosure, local memory 1032 be evenly distributed on chip to relieve dense wiring and heating issues.

Figure 1C:
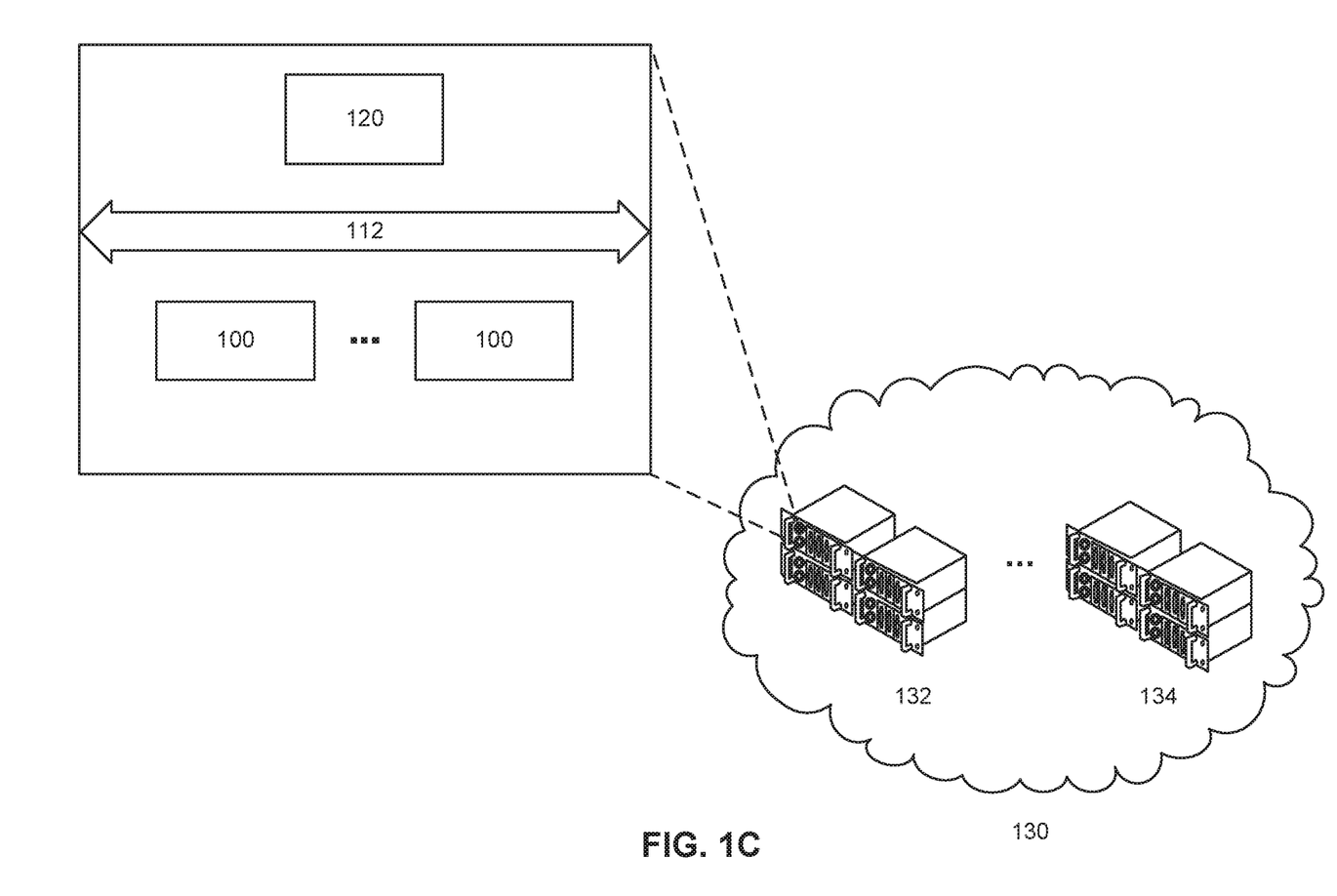
FIG. 1C illustrates a schematic diagram of an exemplary cloud system incorporating accelerator architecture 100, according to some embodiments of the disclosure.

FIG. 1C illustrates a schematic diagram of an exemplary cloud system incorporating accelerator architecture 100, according to some embodiments of the disclosure. As shown in FIG. 1C, cloud system 130 can provide a cloud service with artificial intelligence (AI) capabilities and can include a plurality of computing servers (e.g., 132 and 134). In some embodiments, a computing server 132 can, for example, incorporate a neural network accelerator architecture 100 of FIG. 1A. Neural network accelerator architecture 100 is shown in FIG. 1C in a simplified manner for simplicity and clarity.

With the assistance of neural network accelerator architecture 100, cloud system 130 can provide the extended AI capabilities of image recognition, facial recognition, translations, 3D modeling, and the like. It is appreciated that, neural network accelerator architecture 100 can be deployed to computing devices in other forms. For example, neural network accelerator architecture 100 can also be integrated in a computing device, such as a smart phone, a tablet, and a wearable device.

Figure 2A:
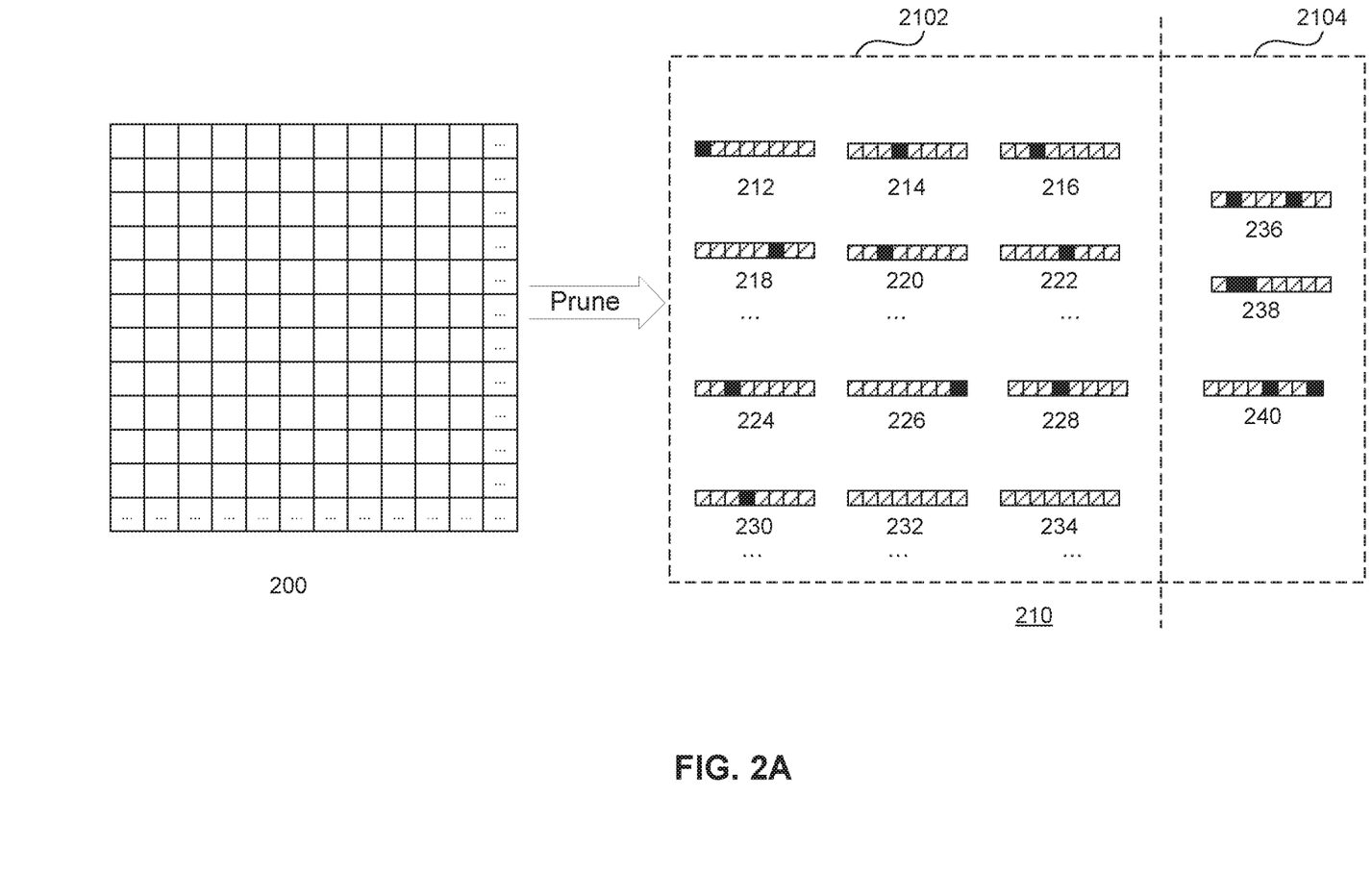
FIG. 2A illustrates a schematic diagram of pruning a weight matrix, according to some embodiments of the disclosure

FIG. 2A illustrates a schematic diagram of pruning a weight matrix 200, according to some embodiments of the disclosure.

Weight matrix 200 can include a plurality of weights for executing an activation function of a neural network. As shown in FIG. 2A, weight matrix 200 is in a form of a matrix including a number of rows. Each row can include a plurality of weights. For example, weight matrix 200 can be a C×S matrix. That is, weight matrix 200 includes C rows and a row size of each row is S units. In an example, the row size S can be 1,006. It is appreciated that weight matrix 200 can be processed as a whole or on a basis of rows.

Weight matrix 200 can be divided into a plurality of vectors, and each vector can include a number of weights. For example, each vector can include eight weights. In other words, a vector size v would be 8. It is appreciated that, while the vector size being 8 is more hardware friendly, any other value can be used as the vector size. The plurality of vectors can be further grouped into two groups. As shown in FIG. 2A, grouped vectors 210 can include a first group 2102 and a second group 2104. In some embodiments, regular pruning can be performed on first group 2102, and irregular pruning can be performed on second group 2104. Therefore, first group 2102 can be also referred to as a regular group 2102 and second group 2104 can also be referred to as an irregular group 2104. For example, during regular pruning, a weight having a largest magnitude among weights of a vector can be retained while the magnitude of the other weights of the vector can be set to zero. And the irregular pruning may retain more than one weight. In FIG. 2A, the weights to be retained during pruning are indicated by black blocks.

The above exemplary embodiments merely aim to show that different pruning methods can be applied on the first and second groups. It is appreciated that, in some embodiments, regular pruning can also be performed on second group 2104.

A vector having at least one non-zero weight can be referred to as a non-zero vector, while a vector having all zero weights can be referred to as a zero vector.

To improve efficiency of executing the neural network based on weight matrix 200, vectors in first group 2102 can be further classified into a given number N of buckets. In some embodiments, the given number N can be equal to the vector size (i.e., 8 in this example). For example, referring to FIG. 1A, the given number N of buckets and the vector size can be determined based on a number of cores 1024 integrated in chip communication system 102.

For pruning weight matrix 200, a pruning ratio p can be determined. Generally, when a weight is pruned, a magnitude of the weight is set to zero. And a magnitude of an unpruned weight can be retained. Therefore, the pruning ratio can define how many weights in matrix 200 are to be pruned. In other words, the pruning ratio is related to a sparsity of a pruned weight matrix. It is appreciated that, if the pruning ratio is higher, more weights are to be pruned.

Before the plurality of vectors of weight matrix 200 can be grouped, parameters of first group 2102 and second group 2104, such as distribution of vectors in first group 2102, a size of second group 2104, and the like, can be determined as below.

In some embodiments, based on the row size S, the pruning ratio p, and the given number N of buckets, a bucket size x of a bucket and a number y of empty vectors in first group 2102 can be determined based on Equations 1-6 below. It is appreciated that the vector size v can be any value and may not be equal to N.

$$N \times v \times x + v \times y \leq S \quad (1)$$

$$N \times x \leq S \times p \quad (2)$$

$$S \times p - N \times x \leq S - (N \times v \times x + v \times y) \quad (3)$$

The bucket size is also known as capacity of the bucket for hosting vectors. In an example, the row size S is 1,006, the pruning ratio p is set to 0.103, and the given number of buckets is 8 (which is also the vector size v). Based on these parameters, the bucket size x can be determined using Equation 4 below.

$$x = \text{floor}(S \times P/N) \quad (4)$$

Therefore, in this example, the bucket size x is floor((1006×0.103)/8)=12. That is, each of the eight buckets can host, at most, 12 vectors. As discussed above, each vector in a bucket of first group 2102 only retains one weight after pruning. Thus, the buckets can host at most x×N weights after pruning. In this example, the buckets of first group 2102 can host at most 12×8=96 weights after pruning.

To determine the number of empty vectors y in first group 2102, Equations 1 and 3 can be rewritten as Equations 5 and 6 below.

$$y \leq S - N \times v \times x / 8 \quad (5)$$

$$y \leq S - S \times p + N \times x - N \times v \times x / 8 \quad (6)$$

In this example, to meet both Equations 5 and 6, the number of empty vectors y≤28. Thus, in this example, based on the row size S, the pruning ratio p, and the given number N of buckets, the bucket size x of a bucket is determined to be 12 and the number of empty vectors y is determined to be 28.

With the determined bucket size x and the number of empty vectors y, a size i of second group 2104 (i.e., the irregular group) and a number nz of non-zero weights to be retained in second group 2104 can be further determined using Equations 7-8 as below.

$$i = S - (N \times 8 \times x + 8 \times y) \quad (7)$$

$$nz = \text{floor}(S \times p) - x \times N \quad (8)$$

In this example, by using Equations 7-8, it can be determined that the size i of second group 2104 is 14, and the number nz of non-zero weights to be retained in second group 2104 is 7.

Thus, based on the row size S, the pruning ratio p, and the given number N of buckets, parameters, such as the bucket size x of a bucket in first group 2102, the number y of empty vectors in first group 2102, the size i of second group 2104, and the number nz of non-zero weights to be retained in second group 2104, can be determined.

Thus, the plurality of vectors of weight matrix 200 can be grouped according to the determined parameters. For example, based on the bucket size x and the number y of empty vectors in first group 2102, a number of vectors in first group 2102 can be determined. And based on the size i of the second group, a number of vectors in second group 2104 can also be determined. In some embodiments, vectors can be grouped to first group 2102 and second group 2104 based on a descending order of magnitudes of the vectors. For example, vectors with larger magnitudes can be grouped to the first group, and vectors with smaller magnitudes can be grouped to the second group. In some embodiments, vectors can be grouped to the first group and the second group based on random selections. It is appreciated that any methods can be applied for grouping the vectors.

Then, vectors in first group 2102 can be assigned to a plurality of buckets. The plurality of buckets can be implemented in a memory of architecture 100 (e.g., host memory 104 or cache memory of chip communication system 102) as, for example, an index or a queue. To improve efficient of execution on hardware, the plurality of buckets can correspond to execution threads or cores of architecture 100, so that vectors in a same bucket can be accessed and processed by a same execution thread or core.

Figure 2B:
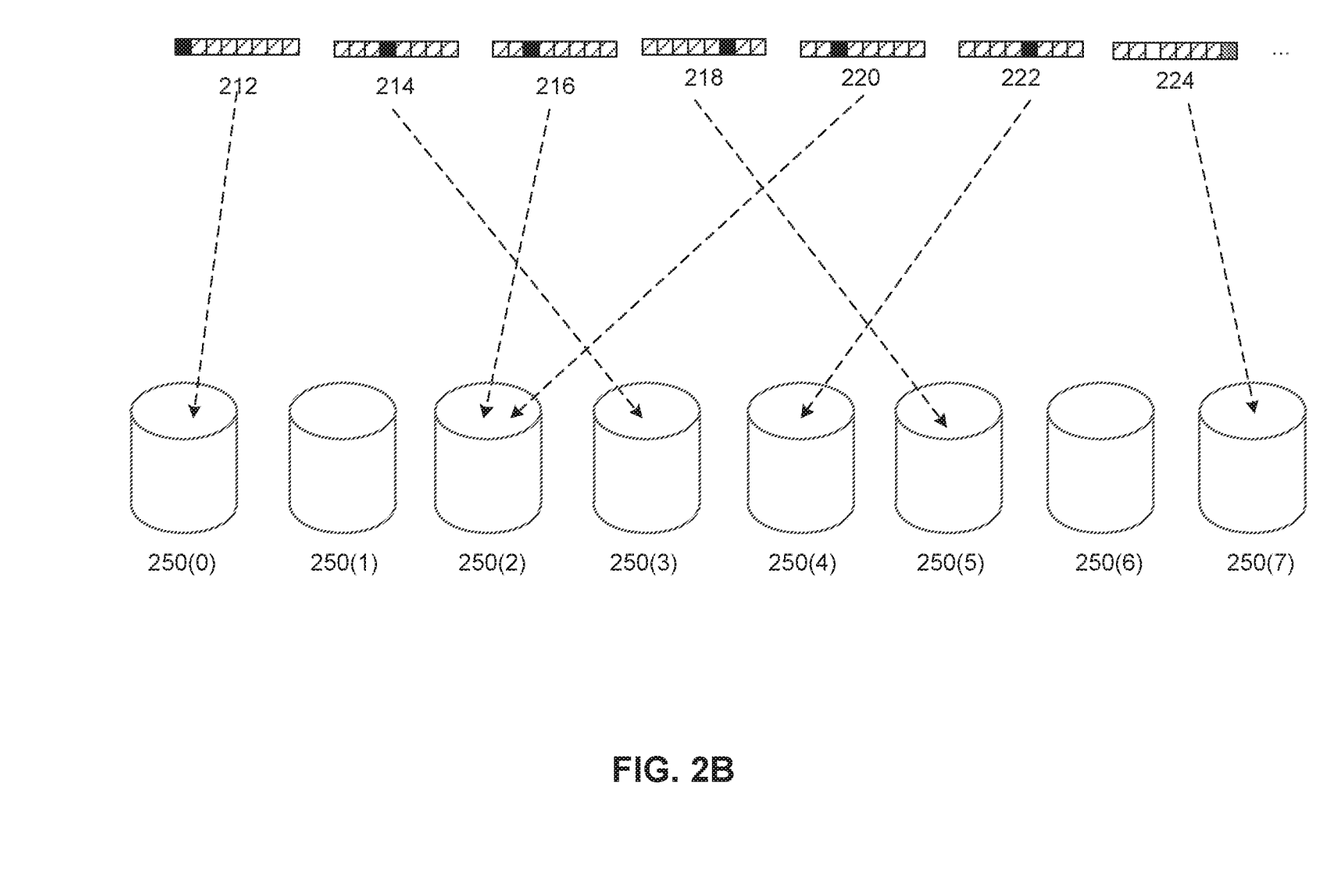
FIG. 2B illustrates a schematic diagram of assigning vectors to a plurality of buckets, according to some embodiments of the disclosure

In some embodiments, vectors in first group 2102 can be assigned to a plurality of buckets according to a position of a key weight in each vector. A key weight can be a weight having a largest magnitude among weights of a vector, and the position of the key weight can be used to assign the vector to a corresponding bucket. FIG. 2B illustrates a schematic diagram of assigning vectors to a plurality of buckets 250 (e.g., buckets 250(0)-250(7)), according to some embodiments of the disclosure.

As shown in FIG. 2B, in vector 212, magnitudes of all weights can be determined to further determine an order of the weights, and the first weight is determined to be a weight having the largest magnitude. In other words, the first weight is a key weight of vector 212, which is marked black in FIG. 2B.

Because the key weight is the first weight of vector 212, vector 212 is determined to be assigned to a first bucket 250(0) among the plurality of buckets 250. A similar approach can be taken for the other vectors where the position of the key weight within the vector can affect the assignment to a corresponding bucket. For example, because the key weight of vector 214 is the fourth weight, vector 214 is assigned to the fourth bucket. Similarly, vectors 216 and 222 (both having key weights at the third position of the vector) are assigned to third bucket 250(2), vector 218 (having a key weight at the sixth position of the vector) is assigned to sixth bucket 250(5), and vector 222 (having a key weight at the fifth position of the vector) is assigned to fifth bucket 250(4).

In some embodiments, before a target vector can be assigned to a bucket according to a position of a key weight of the vector, it can be determined if the bucket is filled at full capacity. As discussed above, bucket size x of a bucket in first group 2102 can be determined. Therefore, when a bucket is filled with x vectors, a target vector cannot be further assigned to this bucket, and the target vector has to be processed before assigning. In some embodiments, when the bucket is filled at full capacity, the key weight of the target vector can be updated.

As an example, in FIG. 2A, the key weight of vector 224 having the largest magnitude is the third weight according to the original order of magnitudes, and a weight having a second largest magnitude in the original order is the eighth weight. In this example, bucket 250(2), which corresponds to the third weight of a vector, is full when vector 224 is being assigned. Thus, vector 224 cannot be assigned to bucket 250(2). In some embodiments, under this situation, the third weight of vector 224, as the original key weight, can be set to zero (indicated by a white block in FIG. 2B) and the order of magnitudes can be updated. Because the third weight is set to zero, the eighth weight of vector 224 now ranks as having the highest magnitude in the updated order of magnitudes (indicated by a dotted block in FIG. 2B). In other words, the key weight of vector 224 is updated to the eighth weight, which is the weight having the second largest magnitude in the original order. Then, vector 224 can be assigned to eighth bucket 250(7), which corresponds to a position of the eighth weight.

Thus, by repeating the above process, the plurality of buckets can be filled with vectors having corresponding key weights, respectively. In this example, a first bucket is filled with vectors each having a first weight as a key weight, a second bucket is filled with vectors each having a second weight as a key weight, a third bucket is filled with vectors each having a third weight as a key weight, and so on.

Because the assigning of vectors is performed according to a descending order of magnitudes of weights in the vectors, vectors having magnitudes less than the vectors in the buckets stay unassigned. Weights of these unassigned vectors are set to zero during pruning, and therefore, the unassigned vectors can also be referred to as empty vectors. Referring back to FIG. 2A, in this example, vectors 232 and 234 can be determined as empty vectors. It is appreciated that, though vectors 232 and 234 are referred to as empty vectors, vectors 232 and 234 are not "empty" before pruning. Though empty vectors are grouped to first group 2102 in this context, it is appreciated that empty vectors can also be grouped as an independent group based on the determined number y of empty vectors.

After the vectors are grouped and assigned, first group 2102 of vectors and second group 2104 of vectors can be pruned. As discussed above, regular pruning can be performed on first group 2102 of vectors, and irregular pruning can be performed on second group 2104.

In some embodiments, in the regular pruning, vectors assigned to buckets can be pruned to only retain key weights. It is appreciated that vectors in a same bucket have key weights at a same position of each vector, as vectors are assigned to buckets according to positions of key weights. Thus, the buckets can host a same number of vectors having a same type, which can be regularly stored in memory and enable efficient parallel decoding and computing. For example, when vectors of a bucket are used during inference, for example, architecture 100 can retrieve pruned weights of the bucket without any complex index for locating the pruned weights as positions of the pruned weights are associated with the bucket itself. Therefore, machine learning can be performed using pruned vectors in first group 2102 in parallel threads corresponding to the plurality of buckets. Furthermore, unassigned vectors can be fully pruned to eventually become "empty" vectors, so that these empty vectors do not function during inference.

In some embodiments, in the irregular pruning, vectors of second group 2104 can be pruned according to determined parameters, e.g., the size i of second group 2104 and the number nz of non-zero weights to be retained in second group 2104. For example, based on the number nz of non-zero weights to be retained in second group 2104, nz weights having the most significant magnitudes in second group 2104 can be retained while others are pruned. It is appreciated that other irregular pruning methods can be applied on second group 2104.

Thus, by the process described above, workload can be distributed evenly on hardware (e.g., cores 102 of architecture 100), memory space for indexing retained weights can be saved as retained weights in a same bucket share a same index, and sparsity of pruned matrix can be maintained without accuracy deteriorating.

Figure 3:
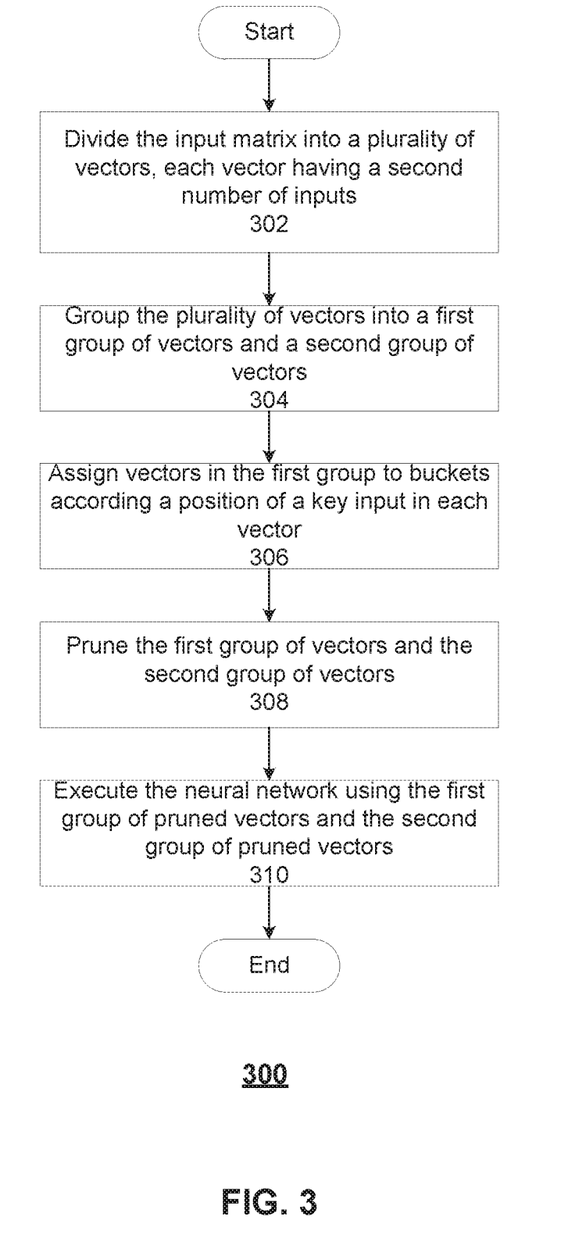
FIG. 3 is a flowchart of an exemplary computer-implemented method for processing a neural network associated with an input matrix having a first number of elements, according to some embodiments of the disclosure.

FIG. 3 is a flowchart of a computer-implemented method for processing a neural network associated with an input matrix having a first number of elements, according to some embodiments of the disclosure.

The machine learning can be performed based on any neural network that requires calculation of an input matrix (e.g., matrix multiplication). For example, the neural network can be a convolutional neural network (CNN), deep neural network (DNN), a recurrent neural network (RNN), and the like, and the input matrix can be a weight matrix or an activation matrix. The weight matrix can include weights for a fully-connected layer in a neural network. Method 300 can be executed by architecture 100 of FIG. 1A. Referring to FIG. 3, method 300 may include the following steps.

At step 302, the input matrix can be divided into a plurality of vectors. In some embodiments, the division can be performed on a basis of rows. As discussed above, each row of the input matrix can be divided into vectors for further process, and a vector size of the vectors can be predetermined to be more hardware-friendly. For example, the vector size can be 8. In some embodiments, the input matrix can be reformed, so that a row size of each row of the reformed input matrix can be an integer multiple of the vector size.

At step 304, the plurality of vectors can be grouped into a first group of vectors and a second group of vectors. The first group (e.g., group 2102 of FIG. 2A) can be a regular pruning group and the second group (e.g., group 2104 of FIG. 2A) can be an irregular pruning group. In the first group, a plurality of buckets can be provided to hold the vectors.

In some embodiments, a pruning ratio for the input matrix can be determined, and parameters of the first group of vectors and the second group of vectors can be determined based on the first number, the second number, and the pruning ratio. The pruning ratio is a ratio of pruned elements among all elements of the input matrix, and is associated with sparsity of a pruned matrix. The parameters can at least include a bucket size for the plurality of buckets in the first group, a number of empty vectors in the first group, a size of the second group, and a number of non-zero elements to be retained in the second group. The detailed calculation of these parameters has been described above with reference to FIGS. 2A-2B, and the description of which is omitted herein for clarity.

Then, based on the determined parameters, the plurality of vectors can be grouped into the first group of vectors and the second group of vectors. For example, based on the bucket size and the number of empty vectors in the first group, a number of vectors in the first group can be determined. And based on the size of the second group, a number of vectors in the second group can also be determined. In some embodiments, vectors can be grouped to the first group and the second group based on a descending order of magnitudes of the vectors. For example, vectors with larger magnitudes can be grouped to the first group, and vectors with smaller magnitudes can be grouped to the second group. In some embodiments, vectors can be grouped to the first group and the second group based on random selections. It is appreciated that any methods can be applied for grouping the vectors.

At step 306, vectors in the first group can be assigned to the plurality of buckets according to a position of a key element in each vector of the first group. In the first group, the plurality of buckets can be provided to hold vectors. A number of the plurality of buckets can correspond to the vector size. And an element having a largest magnitude in the order can be determined as the key element.

Figure 4:
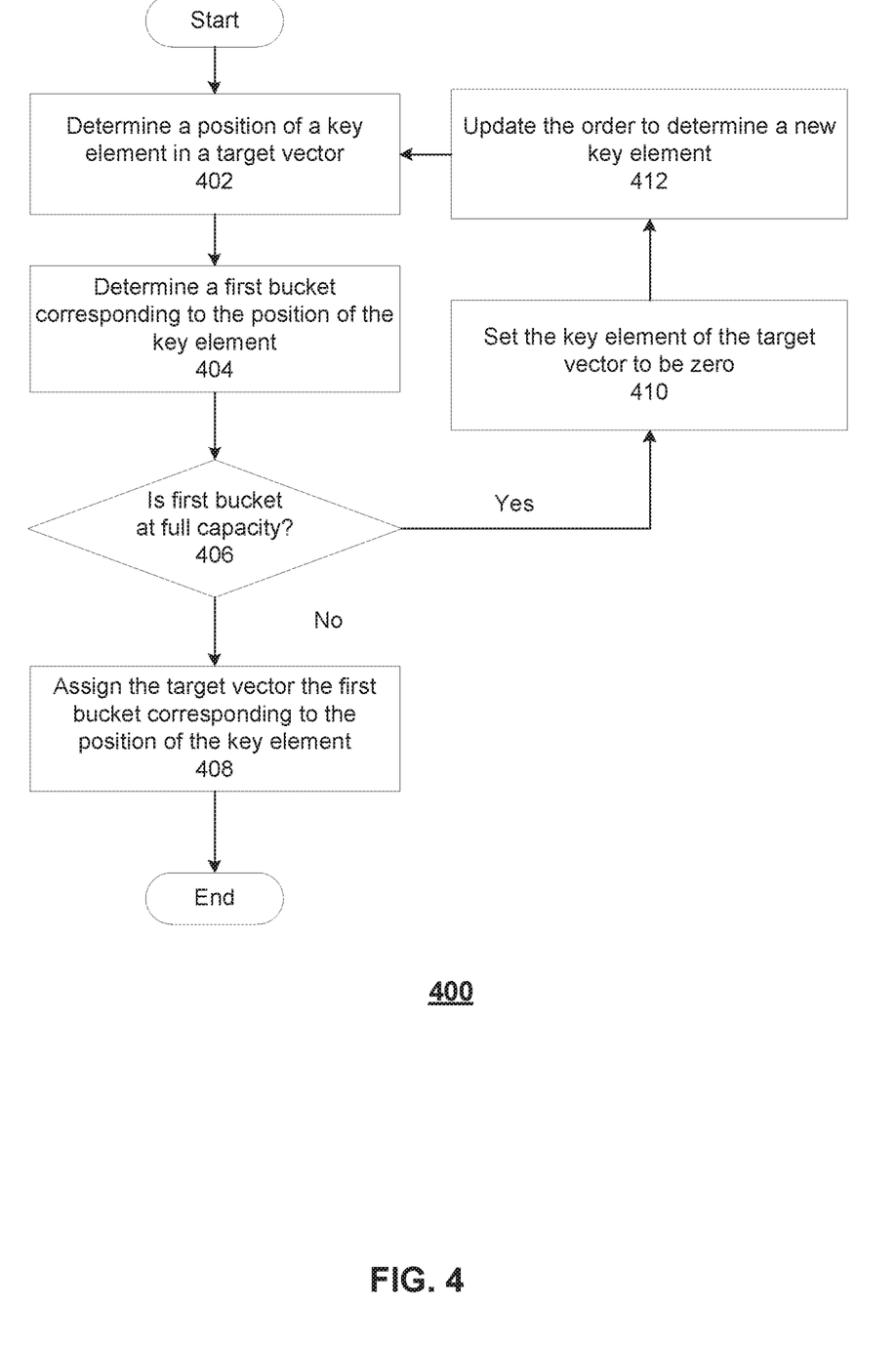
FIG. 4 is a flowchart of an exemplary method for assigning vectors in a first group to buckets according to a position of a key element, according to some embodiments of the disclosure.

Then, vectors in the first group can be assigned to buckets according to the position of the key element in the vector. FIG. 4 is a flowchart of a method 400 for assigning vectors in the first group to buckets according to a position of a key element, according to some embodiments of the disclosure. Though method 400 is described herein as part of method 300, it is appreciated that method 400 can be executed independently. Method 400 can also be implemented by architecture 100 of FIG. 1A, and include steps as below.

At step 402, a position of the key element in a target vector can be determined. For example, referring to FIG. 2B, the key element in vector 212 is determined to be a first element, and thus its position can be determined.

At step 404, a first bucket corresponding to the position of the key element can be determined. Still referring to FIG. 2B, as the key element in vector 212 is the first element, bucket 250(0), which is the first bucket among buckets 250 can be determined to hold vector 212.

At step 406, whether the first bucket is at full capacity can be determined. As discussed above, a bucket size of the buckets has been determined. If the first bucket is filled with vectors (i.e., at full capacity), the target vector can no longer be assigned to the first bucket. If the first bucket is not filled at full capacity, step 408 can be executed.

At step 408, in response to the first bucket being not filled at full capacity, the target vector can be assigned to the first bucket corresponding to the position of the key element.

At step 410, in response to the first bucket being at full capacity, the key element of the target vector can be set to zero.

At step 412, the order of elements of the target vector can be updated to determine a new key element, as the original key element has been set to zero. Method 400 can be repeated using the updated order until the target vector is assigned. It is appreciated that, with the original key element being set to zero, an element having the second largest magnitude in the original order can be now determined to be the key element.

By continuously repeating method 400, eventually, the plurality of buckets in the first group can be evenly filled with vectors according to bucket size, unassigned vectors in the first group can be determined as the empty vectors.

Referring back to FIG. 3, at step 308, the first group of vectors and the second group of vectors can be pruned. In some embodiments, regular pruning can be performed on the first group of vectors, and irregular pruning can be performed on the second group of vectors. For example, for vectors held in the plurality of buckets in the first group, the key element of each vector can be retained, while the other elements of the vector can be pruned. As mentioned above, those unassigned vectors, which have been determined as empty vectors, can also be pruned. For vectors in the second group, any irregular pruning methods can be applied according to the number of non-zero elements to be retained in the second group. In some embodiments, unlike a vector in the bucket with only the key element being retained, a vector in the second group may retain more than one element after pruning. For example, as shown in FIG. 2A, vectors 236-240 each can retain two elements after pruning.

At step 310, after the pruning, the neural network can be executed using the first group of pruned vectors and the second group of vectors. In some embodiments, machine learning can be performed using the first portion of pruned vectors in parallel threads corresponding to plurality of buckets. For example, each thread can be executed on a core of architecture 100.

Thus, by methods 300 and 400 described above, workloads can be distributed more evenly on hardware (e.g., cores of architecture 100), memory space for indexing retained weights can be saved as retained weights in a same bucket share a same index, and sparsity of pruned matrix can be maintained without accuracy deteriorating.

Embodiments of the disclosure also provide a computer program product. The computer program product may include a non-transitory computer readable storage medium having computer readable program instructions thereon for causing a processor to carry out the above-described methods.

The computer readable storage medium may be a tangible device that can store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer readable program instructions for carrying out the above-described methods may be assembler instructions, instruction-set-architecture (ISA) instructions, machine instructions, machine dependent instructions, microcode, firmware instructions, state-setting data, or source code or object code written in any combination of one or more programming languages, including an object oriented programming language, and conventional procedural programming languages. The computer readable program instructions may execute entirely on a computer system as a stand-alone software package, or partly on a first computer and partly on a second computer remote from the first computer. In the latter scenario, the second, remote computer may be connected to the first computer through any type of network, including a local area network (LAN) or a wide area network (WAN).

The computer readable program instructions may be provided to a processor of a computer, or other programmable data processing apparatus to produce a machine, such that the instructions, which execute via the processor of the computer or other programmable data processing apparatus, create means for implementing the above-described methods.

The flow charts and diagrams in the figures illustrate the architecture, functionality, and operation of possible implementations of devices, methods, and computer program products according to various embodiments of the specification. In this regard, a block in the flow charts or diagrams may represent a software program, segment, or portion of code, which comprises one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams or flow charts, and combinations of blocks in the diagrams and flow charts, may be implemented by special purpose hardware-based systems that perform the specified functions or acts, or combinations of special purpose hardware and computer instructions.

The embodiments may further be described using the following clauses:

1. A computer-implemented method for processing a neural network associated with an input matrix having a first number of elements, comprising:
    dividing the input matrix into a plurality of vectors, each vector having a second number of elements;
    grouping the plurality of vectors into a first group of vectors and a second group of vectors;
    pruning the first group of vectors and the second group of vectors; and
    performing machine learning using the first group of pruned vectors and the second group of pruned vectors.

2. The method according to clause 1, further comprising:
    assigning vectors in the first group to a plurality of buckets according to a position of a key element in each vector of the first group.

3. The method according to clause 2, wherein grouping the plurality of vectors into the first group of vectors and the second group of vectors further comprises:
    determining a pruning ratio for the input matrix;
    determining parameters of the first group of vectors and the second group of vectors based on the first number, the second number, and the pruning ratio; and
    grouping the plurality of vectors into the first group of vectors and the second group of vectors based on the determined parameters, wherein
    the parameters comprise a bucket size for the plurality of buckets in the first group, a number of empty vectors in the first group, a size of the second group, and a number of non-zero elements to be retained in the second group.

4. The method according to clause 2 or 3, wherein assigning vectors in the first group to the plurality of buckets according to the position of the key element in each vector of the first group further comprises:
    determining, among the second number of elements in each vector, an order of the second number of elements in the vector by magnitudes of the elements; and
    determining, in the vector, an element having a largest magnitude in the order as the key element.

5. The method according to clause 4, wherein the plurality of buckets have a same capacity of vectors, and assigning vectors in the first group to the plurality of buckets according to the position of the key element in each vector of the first group further comprises:
    determining the position of the key element in a target vector;
    determining a first bucket of the plurality of buckets, wherein the first bucket corresponds to the position of the key element; and
    determining whether the first bucket is filled at full capacity.

6. The method according to clause 5, further comprising:
    in response to the first bucket not being filled at full capacity, assigning the target vector to the first bucket corresponding to the position; or
    in response to the first bucket being filled at full capacity, setting the key element of the target vector to be zero, and updating the order to determine a new key element of the target vector.

7. The method according to clause 3, wherein assigning vectors in the first group to the plurality of buckets further comprises:
    after each of the plurality of buckets are filled with vectors according to the bucket size, determining unassigned vectors in the first group as the empty vectors.

8. The method according to any one of clauses 2-7, further comprising:
    executing the neural network using the first group of pruned vectors and the second group of pruned vectors, wherein executing the neural network using the first group of pruned vectors and the second group of pruned vectors further comprises:
    executing the neural network using the first portion of pruned vectors in parallel threads corresponding to the plurality of buckets.

9. The method according to any one of clauses 1-8, wherein pruning the first group of vectors and the second group of vectors further comprises:

performing regular pruning on the first group of vectors; and performing irregular pruning on the second group of vectors.

10. The method according to any one of clauses 1-9, wherein the input matrix comprises weights for a fully-connected layer.

11. A computing device for processing a neural network associated with an input matrix having a first number of elements, comprising:
a memory storing a set of instructions; and
one or more processors configured to execute the set of instructions to cause the device to:
divide the input matrix into a plurality of vectors, each vector having a second number of elements;
group the plurality of vectors into a first group of vectors and a second group of vectors;
prune the first group of vectors and the second group of vectors; and
perform machine learning using the first group of pruned vectors and the second group of pruned vectors.

12. The device according to clause 11, wherein the set of instructions is further executed by the one or more processors to cause the device to:
assign vectors in the first group to a plurality of buckets according to a position of a key element in each vector of the first group.

13. The device according to clause 12, wherein in grouping the plurality of vectors into the first group of vectors and the second group of vectors, the set of instructions is further executed by the one or more processors to cause the device to:
determine a pruning ratio for the input matrix;
determine parameters of the first group of vectors and the second group of vectors based on the first number, the second number, and the pruning ratio; and
group the plurality of vectors into the first group of vectors and the second group of vectors based on the determined parameters, wherein
the parameters comprise a bucket size for the plurality of buckets in the first group, a number of empty vectors in the first group, a size of the second group, and a number of non-zero elements to be retained in the second group.

14. The device according to clause 12 or 13, wherein in assigning vectors in the first group to the plurality of buckets according to the position of the key element in each vector of the first group, the set of instructions is further executed by the one or more processors to cause the device to:
determine, among the second number of elements in each vector, an order of the second number of elements in the vector by magnitudes of the elements; and
determine, in the vector, an element having a largest magnitude in the order as the key element.

15. The device according to clause 14, wherein the plurality of buckets have a same capacity of vectors, and in assigning vectors in the first group to the plurality of buckets according to the position of the key element in each vector of the first group, the set of instructions is further executed by the one or more processors to cause the device to:
determine the position of the key element in a target vector;
determine a first bucket of the plurality of buckets, wherein the first bucket corresponds to the position of the key element; and
determine whether the first bucket is filled at full capacity.

16. The device according to clause 15, wherein in assigning vectors in the first group to the plurality of buckets according to the position of the key element in each vector of the first group, the set of instructions is further executed by the one or more processors to cause the device to:
in response to the first bucket not being filled at full capacity, assign the target vector to the first bucket corresponding to the position; or
in response to the first bucket being filled at full capacity, set the key element of the target vector to be zero, and update the order to determine a new key element of the target vector.

17. The device according to clause 13, wherein in assigning vectors in the first group to the plurality of buckets, the set of instructions is further executed by the one or more processors to cause the device to:
after each of the plurality of buckets are filled with vectors according to the bucket size, determine unassigned vectors in the first group as the empty vectors.

18. The device according to any one of clauses 12-17, wherein the set of instructions is further executed by the one or more processors to cause the device to:
executing the neural network using the first group of pruned vectors and the second group of pruned vectors, wherein executing the neural network using the first group of pruned vectors and the second group of pruned vectors further comprises executing the neural network using the first portion of pruned vectors in parallel threads corresponding to the plurality of buckets.

19. The device according to any one of clauses 11-18, wherein in pruning the first group of vectors and the second group of vectors, the set of instructions is further executed by the one or more processors to cause the device to:
perform regular pruning on the first group of vectors; and
perform irregular pruning on the second group of vectors.

20. The device according to any one of clauses 11-19, wherein the input matrix comprises weights for a fully-connected layer.

21. A non-transitory computer readable medium that stores a set of instructions that is executable by one or more processors of an apparatus to cause the apparatus to execute a method for processing a neural network associated with an input matrix having a first number of elements, the method comprising:
dividing the input matrix into a plurality of vectors, each vector having a second number of elements;
grouping the plurality of vectors into a first group of vectors and a second group of vectors; and
pruning the first group of vectors and the second group of vectors.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not to be considered essential features of those embodiments, unless the embodiment is inoperative without those elements.

What is claimed is:

1. A computer-implemented method for processing a neural network associated with an input matrix having a first number of elements, comprising:
    dividing the input matrix into a plurality of vectors, each vector having a second number of elements;
    grouping the plurality of vectors into a first group of vectors and a second group of vectors;
    assigning vectors in the first group to a plurality of buckets according to a position of a key element in each vector of the first group;
    pruning the first group of vectors and the second group of vectors; and
    executing the neural network using the first group of pruned vectors and the second group of pruned vectors, wherein the neural network is executed using the first group of pruned vectors in parallel threads corresponding to the plurality of buckets,
    wherein grouping the plurality of vectors into the first group of vectors and the second group of vectors further comprises:
    determining a pruning ratio for the input matrix;
    determining parameters of the first group of vectors and the second group of vectors based on the first number, the second number, and the pruning ratio; and
    grouping the plurality of vectors into the first group of vectors and the second group of vectors based on the determined parameters,
    the parameters comprising at least one of a bucket size for the plurality of buckets in the first group, a number of empty vectors in the first group, a size of the second group, or a number of non-zero elements to be retained in the second group.

2. The method according to claim 1, wherein assigning vectors in the first group to the plurality of buckets according to the position of the key element in each vector of the first group further comprises:
    determining, among the second number of elements in each vector, an order of the second number of elements in the vector by magnitudes of the elements; and
    determining, in the vector, an element having a largest magnitude in the order as the key element.

3. The method according to claim 2, wherein the plurality of buckets have a same capacity of vectors, and assigning vectors in the first group to the plurality of buckets according to the position of the key element in each vector of the first group further comprises:
    determining the position of the key element in a target vector;
    determining a first bucket of the plurality of buckets, wherein the first bucket corresponds to the position of the key element; and
    determining whether the first bucket is filled at full capacity.

4. The method according to claim 3, further comprising:
    in response to the first bucket not being filled at full capacity, assigning the target vector to the first bucket corresponding to the position; or
    in response to the first bucket being filled at full capacity, setting the key element of the target vector to be zero, and updating the order to determine a new key element of the target vector.

5. The method according to claim 1, wherein pruning the first group of vectors and the second group of vectors further comprises:
    performing regular pruning on the first group of vectors; and
    performing irregular pruning on the second group of vectors.

6. The method according to claim 1, wherein the input matrix comprises weights for a fully-connected layer.

7. A computing device for processing a neural network associated with an input matrix having a first number of elements, comprising:
    a memory storing a set of instructions; and
    one or more processors configured to execute the set of instructions to cause the device to:
    divide the input matrix into a plurality of vectors, each vector having a second number of elements;
    group the plurality of vectors into a first group of vectors and a second group of vectors;
    assign vectors in the first group to a plurality of buckets according to a position of a key element in each vector of the first group;
    prune the first group of vectors and the second group of vectors; and
    execute the neural network using the first group of pruned vectors and the second group of pruned vectors, wherein the neural network is executed using the first group of pruned vectors in parallel threads corresponding to the plurality of buckets,
    wherein in grouping the plurality of vectors into the first group of vectors and the second group of vectors, the set of instructions is further executed by the one or more processors to cause the device to:
    determine a pruning ratio for the input matrix;
    determine parameters of the first group of vectors and the second group of vectors based on the first number, the second number, and the pruning ratio; and
    group the plurality of vectors into the first group of vectors and the second group of vectors based on the determined parameters,
    the parameters comprising at least one of a bucket size for the plurality of buckets in the first group, a number of empty vectors in the first group, a size of the second group, or a number of non-zero elements to be retained in the second group.

8. The device according to claim 7, wherein the set of instructions is further executed by the one or more processors to cause the device to:
    determine, among the second number of elements in each vector, an order of the second number of elements in the vector by magnitudes of the elements; and
    determine, in the vector, an element having a largest magnitude in the order as the key element.

9. The device according to claim 8, wherein the plurality of buckets have a same capacity of vectors, and the set of instructions is further executed by the one or more processors to cause the device to:
    determine the position of the key element in a target vector;
    determine a first bucket of the plurality of buckets, wherein the first bucket corresponds to the position of the key element; and
    determine whether the first bucket is filled at full capacity.

10. The device according to claim 9, wherein the set of instructions is further executed by the one or more processors to cause the device to:
  in response to the first bucket not being filled at full capacity, assign the target vector to the first bucket corresponding to the position; or
  in response to the first bucket being filled at full capacity, set the key element of the target vector to be zero, and update the order to determine a new key element of the target vector.

11. The device according to claim 7, wherein the set of instructions is further executed by the one or more processors to cause the device to:
  perform regular pruning on the first group of vectors; and
  perform irregular pruning on the second group of vectors.

12. The device according to claim 7, wherein the input matrix comprises weights for a fully-connected layer.

13. A non-transitory computer readable medium that stores a set of instructions that is executable by one or more processors of an apparatus to cause the apparatus to execute a method for processing a neural network associated with an input matrix having a first number of elements, the method comprising:
  dividing the input matrix into a plurality of vectors, each vector having a second number of elements;
  grouping the plurality of vectors into a first group of vectors and a second group of vectors;
  assigning vectors in the first group to a plurality of buckets according to a position of a key element in each vector of the first group;
  pruning the first group of vectors and the second group of vectors; and
  executing the neural network using the first group of pruned vectors and the second group of pruned vectors, wherein the neural network is executed using the first group of pruned vectors in parallel threads corresponding to the plurality of buckets,
  wherein grouping the plurality of vectors into the first group of vectors and the second group of vectors further comprises:
  determining a pruning ratio for the input matrix;
  determining parameters of the first group of vectors and the second group of vectors based on the first number, the second number, and the pruning ratio; and
  grouping the plurality of vectors into the first group of vectors and the second group of vectors based on the determined parameters,
  the parameters comprising at least one of a bucket size for the plurality of buckets in the first group, a number of empty vectors in the first group, a size of the second group, or a number of non-zero elements to be retained in the second group.

14. The method according to claim 1, wherein the vectors assigned to a same bucket share a same index.

15. The device according to claim 7, wherein the vectors assigned to a same bucket share a same index.

16. The non-transitory computer readable medium according to claim 13, wherein the vectors assigned to a same bucket share a same index.

17. The method according to claim 1, wherein assigning vectors in the first group to the plurality of buckets further comprises:
  after each of the plurality of buckets are filled with vectors according to the bucket size, determining unassigned vectors in the first group as the empty vectors.

18. The device according to claim 7, wherein in assigning vectors in the first group to the plurality of buckets, the set of instructions is further executed by the one or more processors to cause the device to:
  after each of the plurality of buckets are filled with vectors according to the bucket size, determine unassigned vectors in the first group as the empty vectors.

* * * * *